UNITED STATES PATENT OFFICE.

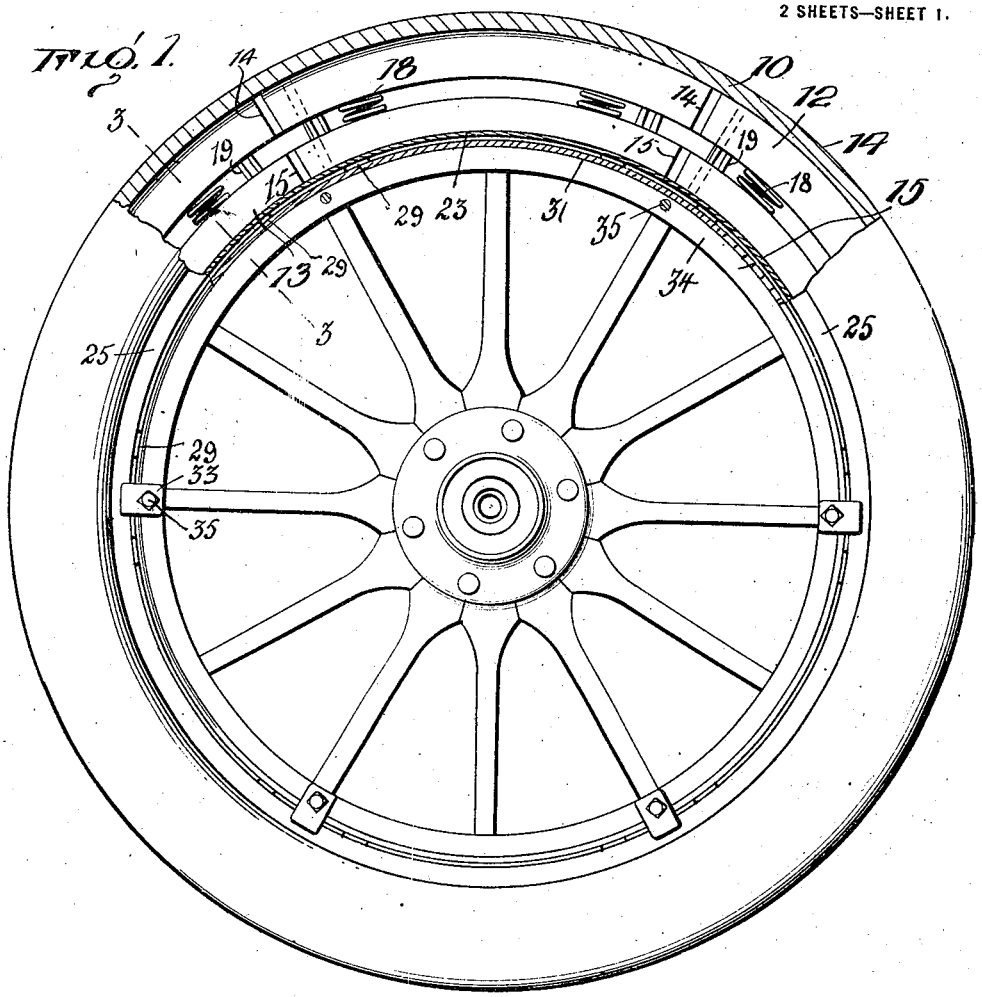

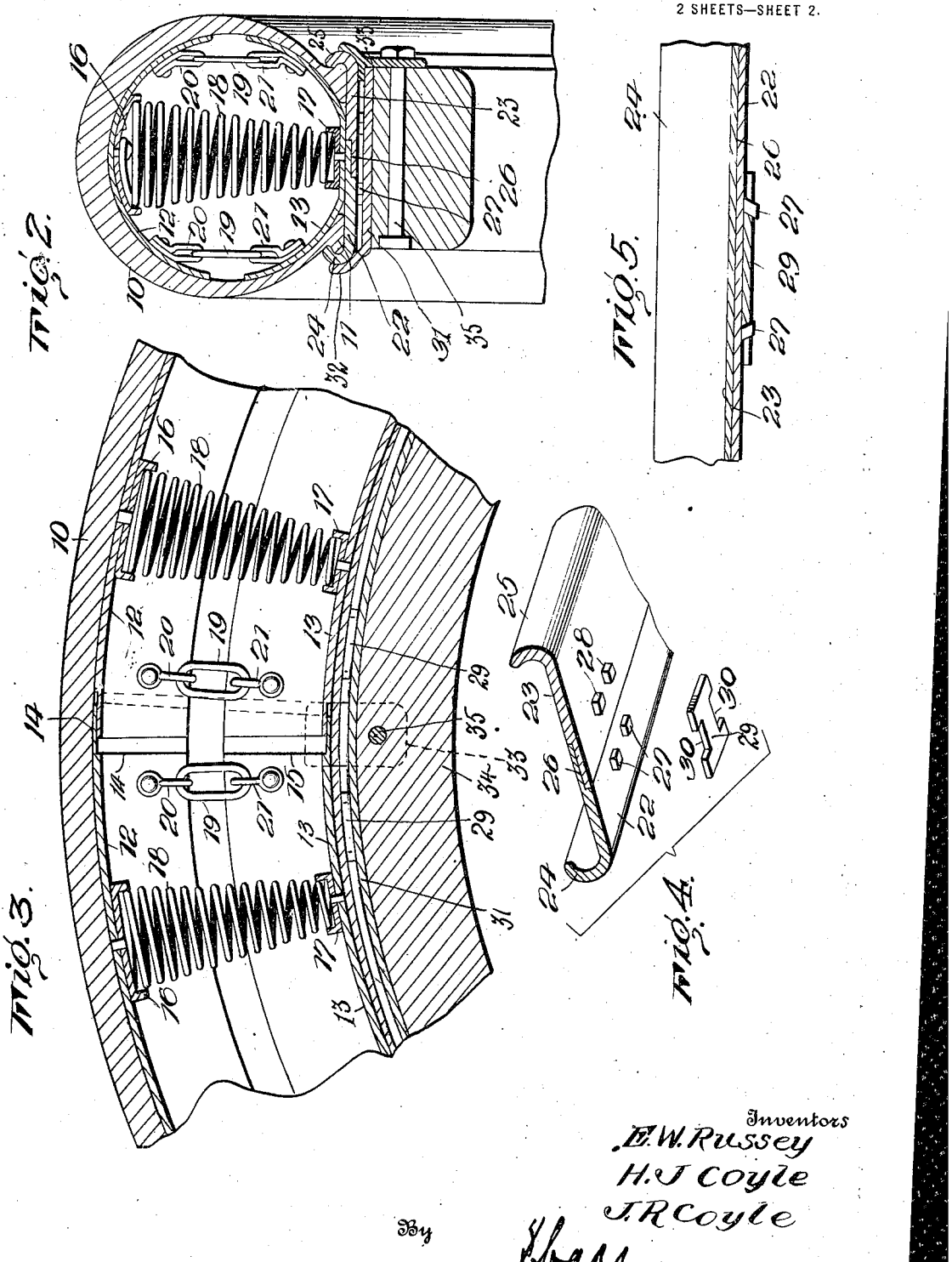

EDWARD W. RUSSEY, OF SEYMOUR, TEXAS, AND HENRY J. COYLE AND JAMES R. COYLE, OF HUNTSVILLE, ALABAMA; SAID HENRY J. COYLE AND SAID JAMES R. COYLE ASSIGNORS OF ONE-SIXTH OF THE ENTIRE RIGHT TO SAID RUSSEY.

VEHICLE-TIRE.

1,215,414.  Specification of Letters Patent.  Patented Feb. 13, 1917.

Application filed December 31, 1915. Serial No. 69,587.

*To all whom it may concern:*

Be it known that we, EDWARD W. RUSSEY, of Seymour, in the county of Baylor and State of Texas, HENRY J. COYLE and JAMES R. COYLE, residing at Huntsville, in the county of Madison and State of Alabama, citizens of the United States, have invented certain new and useful Improvements in Vehicle-Tires, of which the following is a specification.

This invention relates to the tires of vehicles of the automobile class, and has for one of its objects to provide a tire having the requisite resiliency or yieldableness without danger of injury by puncturing, and wherein the relatively fragile pneumatic tubes are dispensed with.

Another object of the invention is to provide a device of this character in which inner metallic sectional sheathings and springs are substituted for the pneumatic or inflatable tube.

Another object of the invention is to provide a device of this character which may be attached to the ordinary wheel without material structural change.

With these and other objects in view, the invention consists in certain novel features of construction as hereinafter shown and described, and then specifically pointed out in the claims; and in the drawings illustrative of the preferred embodiment of the invention—

Figure 1 is a side elevation partly in section of an automobile wheel with the improvement applied;

Fig. 2 is an enlarged section on the line 3—3 of Fig. 1;

Fig. 3 is a longitudinal section of a portion of the tire illustrating the construction.

Fig. 4 represents portions of a pair of the coacting tire casing holding members and one of the locking devices;

Fig. 5 is an enlarged longitudinal section of portions of a coacting pair of the tire casing holding members and one of the locking devices.

The improved device is designed to be applied to the interior of an ordinary pneumatic tire casing, such casing being indicated conventionally at 10 and provided with casing beads 11 to receive holding devices, as hereafter specified. Arranged within the casing 10 are a plurality of semi-cylindrical sheet or plate metal sections overlapping at their confronting ends and occupying the entire interior of the tire. One set 12 of the semi-cylindrical members bear against the inner face of the outer portion of the tire casing, while the other set 13 of the semi-cylindrical sections bear against the inner faces of the tire casing and in engagement with the casing beads 11 as illustrated in Fig. 2.

At their confronting ends the sections 12 are reduced and overlap, as represented at 14, while the confronting ends of the sections 13 are likewise reduced and overlap, as shown at 15, the overlapped portions fitting with sufficient degree of looseness to permit the requisite flexibility when pressure is applied to the tire.

Riveted or otherwise attached to the inner faces of each of the sections 12 are cup-like holding devices, represented at 16, while similar but smaller cup-like devices 17 are attached at intervals to each of the inner sections 13. The cup-like devices form seats for springs, represented at 18, the terminals of the springs being held by the same rivet which holds the cups to the sections. Preferably the cups or socket members 17 are smaller than the cups or socket members 16, and the springs are correspondingly reduced toward their inner ends, but the springs may be of other shapes if preferred.

Any required number of springs may be employed but for the purpose of illustration two are represented in Fig. 1 located between each opposite pair of the sections and relatively near their ends. The springs thus operate to maintain the sections in separated position and thus hold the tire casing in its distended condition. Holding links 19 are connected at 20—21 respectively to the sections 12—13 to limit the outward movement of the sections 12 while at the same time permitting them to be compressed by outside pressure when the load is applied to the wheel. By this means the links serve as safety appliances to relieve the springs from undue strains, as will be obvious.

The casing beads 11 are designed to be coupled by annular plates 22—23 rolled outwardly at their outer edges, as represented at 24—25 to engage over the casing beads 11.

At their confronting edges the plates 22—23 are reduced and overlapped, as shown at 26. Projecting at suitable intervals from the members 22—23 and relatively near their confronting edges are lugs 27—28 arranged in pairs and adapted to receive locking plates 29 having recesses 30 in their opposite edges, the recessed portions being designed to receive the lugs 27—28 and thus lock the members 22—23 firmly in close relation. The springs 18 will operate to distend the sections 12—13 normally to a greater distance than the interior diameter of the casing 10, hence it is necessary to compress the casing around the members 12—13, and any suitable means may be employed to accomplish this result. By this means it will be obvious that a strong and durable and yieldable interior structure is produced which may be disposed within a tire casing and as a substitute for the ordinary inflatable inner tube, and accomplishes precisely the same results as the pneumatic tire without danger of injury by puncturing or the like. The tire thus constructed will yield to pressure when the load is applied in precisely the same manner as the pneumatic tire, the parts yielding sufficiently to prevent cramping or displacement.

The tire thus constructed may be applied to the ordinary clencher rim of a wheel in the ordinary manner, without material structural changes.

The rim of the improved wheel is formed of a main or body portion 31 secured to the felly as by shrinking thereon and having an outturned edge 32 to bear over the portion 24 of the member 22. A plurality of clip devices 33 bear against the felly at the side opposite the rolled edge 32 of the rim and are extended to bear over the outturned portion 25 of the member 23 and secured to the felly 34 by bolts 35. The bottoms of the recesses 30 of the locking members 29 are preferably beveled, and the lugs bent toward each other after the locking members are in place, as illustrated in Fig. 5, to hold the locking members.

Having thus described the invention, what is claimed as new is:—

1. In a vehicle tire, a plurality of outer and inner sections conforming to and adapted to closely engage the inner face of a tire casing and entirely inclosed thereby, the longitudinal edges of the sections being spaced apart, a plurality of yieldable devices bearing against the inner faces of the sections at their longitudinal centers, and coupling devices connected to the inner faces of the sections and spaced inwardly from the edges of the same, said coupling devices operating to limit the outward movement of the outer sections.

2. In a vehicle tire, a plurality of outer and inner sections conforming to and adapted to closely engage the inner face of the tire casing and entirely inclosed thereby, the longitudinal edges of the sections being spaced apart, a plurality of yieldable devices bearing against the inner faces of the sections at their longitudinal centers, eyes attached to the inner faces of said sections and spaced inwardly from their edges, and links connected respectively to said eyes.

3. In a vehicle tire, a plurality of outer and inner sections conforming to and adapted to closely engage the inner face of a tire casing and entirely inclosed thereby, the longitudinal edges of the sections being spaced apart, a plurality of yieldable devices bearing against the inner faces of the sections at their longitudinal centers, and coupling devices connected to said sections and spaced inwardly from the edges of and disposed entirely within the same.

4. The combination with a wheel including the rim and tire casing, of a plurality of outer and inner rigid sections conforming to and closely engaging the inner face of the casing and the exposed portion of the rim and entirely inclosed thereby, the longitudinal edges of the sections being spaced apart, and a plurality of coupling devices connected to the inner faces of the sections and spaced inwardly from their edges, said coupling devices operating to limit the outward movement of the outer sections.

In testimony whereof, we affix our signatures.

EDWARD W. RUSSEY. [L. S.]
HENRY J. COYLE. [L. S.]
JAMES R. COYLE. [L. S.]